Dec. 17, 1935.                R. E. VALENTINE                2,024,752
                          PRESSURE INDICATING DEVICE
                            Filed Sept. 19, 1931
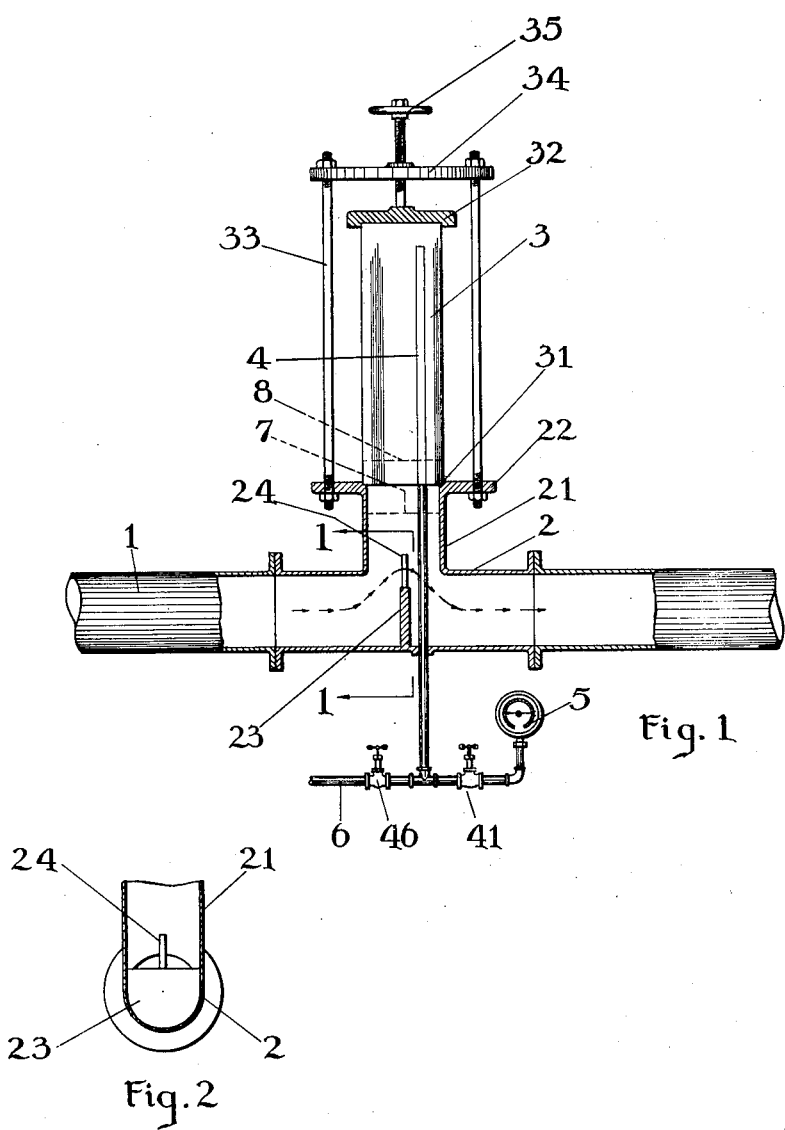
Inventor
Ralph E. Valentine
By John Lawrence Seymour
Attorney

Patented Dec. 17, 1935

2,024,752

UNITED STATES PATENT OFFICE 2,024,752

PRESSURE INDICATING DEVICE

Ralph E. Valentine, Passaic, N. J., assignor to Du Pont Cellophane Company, Inc., New York, N. Y., a corporation of Delaware Application September 19, 1931, Serial No. 563,730

9 Claims. (Cl. 73—31)

This invention relates to an apparatus for measuring the pressure of fluids in pipe lines or vessels containing liquids. More particularly the invention relates to an apparatus for measuring the pressure, in pipe lines, of liquids that are changing in physical properties. The invention will be described as an apparatus for measuring the pressure of viscose in pipe lines, but it is to be understood that the invention is equally applicable to the determination of pressures, in pipe lines or vessels, of other fluids which change in physical properties, or which absorb gases.

Viscose is a solution widely used in the manufacture of artificial silk and for the production of transparent sheets of regenerated cellulose. To produce a thread or film having clarity and other desirable physical characteristics, it is necessary that the viscose be cast or spun at a particular age. If the solution is kept too long, it tends to gel and become solid and, if the solution is heated, this tendency is increased. As the viscose is brought from the "ripening" tanks to the casting or spinning machines it continues to ripen in the pipes and, if the transit is unduly or variably delayed, a non-uniform product will result. Large pipes cannot be used for transportation because the velocity therein would necessarily be low and danger of too great ripening would exist. It is necessary, consequently, to use a small delivery pipe and to work with a relatively large pressure drop between the feed tanks and the machines. Under these conditions, since the viscosity of the viscose is always relatively high, a slight geling of the viscose in the pipe creates a very serious condition. It is important, therefore, to have some accurate means for measuring the pressure at various points in the viscose line.

A common method of measuring pressure has been to connect a pressure gauge with the pipe line by a U tube containing oil. This means is not satisfactory when the viscose remains stagnant in the connecting pipe and, if the gauge connections are not dismantled and cleaned each day the viscose gels and impairs the accuracy of the gauge. Another means which has been used consists in attaching a pressure dome to the pipe with a pressure gauge connected. This means is also unsatisfactory because the viscose which rises in the chamber soon becomes gelled and makes the reported pressure unreliable.

A pressure dome, or air bell as it is sometimes called, is an air-containing dome-shaped chamber opening into the pipe line. Pressure surges in the line are absorbed by the dome, in which the air is compressed or expanded as the pressure in the line rises or decreases, insuring an even flow in the line beyond the dome.

An object of this invention is to make possible an accurate measurement of pressure in pipe lines containing liquids whose physical characteristics are changing. Another object of the invention is to devise an apparatus which will be easily operated and easily kept clean. Other objects of the invention will be in part apparent and in part set forth in the following description.

In the drawing Figure 1 is a side elevation, partly in section, of one form of my apparatus. Figure 2 is a section on line 1—1 of Figure 1.

In the drawing numeral 1 is a pipe line containing viscose; 2 is a section of pipe; 21 is an angle in said pipe section; 22 is an annular flange on said angle; 23 is a weir in the pipe section beneath the angle 21 which extends, as shown in Figure 2, not quite to the angle opening; 24 is an indicating pin whose function will be described later; 3 is a transparent bell dome or pressure dome for equalizing the inequalities of pressure in the pipe line; 31 is a seat in the angle 21 in which rests the lower end of the dome; 32 is a seat for the upper end of the dome; 33 are bolts seated in flange 22; 34 is a plate; 35 is a screw mounted in said plate by means of which the head 32 is forced into sealing contact with the upper end of the dome 3 and by which the lower end of dome 3 is forced into sealing contact with seat 31. Suitable sealing means can be used between the dome and the seats at each end.

4 is a pipe extending into the dome with its upper end open and near the top of the dome; 5 is a pressure gauge for measuring the pressure inside dome 3; 41 is a valve for disconnecting the gauge from the dome; 6 is a pipe leading from a compressed air tank, an air pump or other source of air or gas pressure not shown, to pipe 4; 46 is a valve for disconnecting pipe 4 from the said source of pressure.

The operation of my device is as follows:—

The viscose flowing along pipe 1 encounters the weir and is thereby directed upwardly into the angle 21 to about the line 7; the valve 46 is closed and the valve 41 is opened in order that the pressure inside the dome may be determined.

Since viscose has the property of absorbing air, in time the level of viscose in the dome will rise to above line 8. At this point the reading of the gauge 5 will not be accurate. It is necessary, consequently, that the air in the dome be replenished in order that the viscose may be forced back to its normal level. The valve 41 is, consequently, closed to protect the gauge against excessive pressures; the valve 46 is opened and the air pressure forces the level of the viscose down until the top of indicating pin 24 can be seen. At this point the valve 46 is turned off and accurate measurements can again be taken on gauge 5.

It is necessary to "blow" only occasionally. Under normal circumstances with a viscose of proper age or "ripeness" blowing once a day will be sufficient to maintain the accuracy of the apparatus.

No cleaning is necessary with this apparatus and precise results are obtained after months of operation.

If it is desired, a gas can be used in the dome which is not absorbed by the viscose. In this case replenishment is required only to replace the gas which leaks past the seal at the top and bottom of the bell.

The pipe has been shown as mounted through the viscose pipe. This is, of course, unnecessary as the pipe could be mounted through the dome.

I have described my invention as applied to the measurement of pressure in pipe lines carrying viscose but it is to be understood that it can be used to measure the pressure of any liquid and will be found particularly advantageous in connection with fluids which frequently change in state. Such liquids are glacial acetic acid, lactic acid, oleic acid, phenol, petroleum jelly, and butyl alcohol. Other materials having similar characteristics will be obvious to those skilled in the art.

As many apparently widely different embodiments of this invention may be made without departing from the spirit and scope thereof, it is to be understood that I do not limit myself to the specific embodiments thereof except as defined in the appended claims.

I claim:

1. An apparatus for determining the pressure in a pipe line containing a liquid comprising a pipe, a pressure dome attached thereto, means in the pipe for directing liquid into the dome, a pipe leading into and above the liquid line in said dome, a pressure gauge operatively connected to said second mentioned pipe, a source of super-atmospheric air pressure operably connected to said second mentioned pipe, and indicating means for locating a liquid level in said dome.

2. An apparatus for determining the pressure in a pipe line containing a liquid comprising a pipe line, a transparent pressure dome attached thereto, a weir in the pipe line beneath the dome, indicating means upon said weir, a pipe leading into and above the liquid line in said dome, a pressure gauge operatively connected to said pipe, and a source of super-atmospheric air pressure connected operably to said pipe.

3. An apparatus for determining the pressure in a pipe line containing a liquid subject to change in its physical state comprising a pipe, a transparent pressure dome attached thereto, a weir in the pipe beneath the dome, an indicating pin upon said weir, a pipe leading into and above the liquid line in said dome, a pressure gauge connected detachedly to said second mentioned pipe, and a source of air pressure connected detachedly to said second mentioned pipe.

4. An apparatus for determining the pressure in a pipe line containing viscose comprising a pipe, a transparent pressure dome attached thereto, a weir in the pipe beneath the dome, an indicating pin upon said weir, a pipe leading into and above the liquid line in said dome, a pressure gauge connected by a valve to said second mentioned pipe, and a source of air pressure connected to said second mentioned pipe by a valve.

5. In an apparatus for determining the pressure of a flowing liquid, a pipe for containing flowing liquid, an air bell thereon, a weir in the pipe for directing flowing liquid through the base of the bell, means for supplying air at super-atmospheric pressure to the bell so that a selected volume may be entrapped, and means for determining the pressure within the bell.

6. In an apparatus for determining the pressure of a flowing liquid, a pipe for containing flowing liquid, a chamber thereon containing entrapped gas, a weir in the pipe for directing the flowing liquid through the base of the chamber to seal the gas therewithin, means for supplying gas to the chamber and for ejecting liquid therefrom, and means attached to said supplying means for determining the pressure within the chamber.

7. In an apparatus for determining pressure, means containing a flowing liquid under pressure, a chamber thereon containing entrapped gas, a weir beneath said chamber for sealing the chamber with the flowing liquid, means for supplying gas to the chamber, and means for determining the pressure within the chamber.

8. In an apparatus for determining pressure, means for containing a flowing liquid, a gas chamber thereon which is adapted to be sealed by flowing liquid, means for supplying gas to the chamber without interrupting the flow of said liquid, and means for determining the pressure within the chamber.

9. In an apparatus for determining pressure, a means for containing a flowing liquid, a chamber thereon adapted to contain gas ensealed by flowing liquid, means for determining the pressure within the chamber, and means for breaking the seal without interrupting the flow of said liquid.

RALPH E. VALENTINE.